(12) United States Patent
Choi

(10) Patent No.: US 12,173,816 B2
(45) Date of Patent: Dec. 24, 2024

(54) CAP LOOSENING PREVENTION DEVICE

(71) Applicant: Yuk Nam Choi, Bucheon-si (KR)

(72) Inventor: Yuk Nam Choi, Bucheon-si (KR)

( * ) Notice: Subject to any disclaimer, the term of this patent is extended or adjusted under 35 U.S.C. 154(b) by 0 days.

(21) Appl. No.: 16/958,682

(22) PCT Filed: Dec. 28, 2018

(86) PCT No.: PCT/KR2018/016837
§ 371 (c)(1),
(2) Date: Jun. 27, 2020

(87) PCT Pub. No.: WO2019/132573
PCT Pub. Date: Jul. 4, 2019

(65) Prior Publication Data
US 2020/0386352 A1 Dec. 10, 2020

(30) Foreign Application Priority Data
Dec. 28, 2017 (KR) .......................... 20-2017-0006784

(51) Int. Cl.
*F16L 19/00* (2006.01)
*F16L 55/115* (2006.01)

(52) U.S. Cl.
CPC .......... *F16L 19/005* (2013.01); *F16L 55/115* (2013.01); *F16L 2201/20* (2013.01)

(58) Field of Classification Search
CPC . F16L 19/005; F16L 2201/20; F16L 55/1286; F16B 39/00
See application file for complete search history.

(56) References Cited

U.S. PATENT DOCUMENTS 2,992,018 A * 7/1961 Rosan ....................... F16L 5/00
285/81
3,702,707 A * 11/1972 J.Rosan, Sr. .......... F16L 15/008
285/23
2013/0221658 A1* 8/2013 Patel ..................... F16L 19/005
285/81

(Continued)

FOREIGN PATENT DOCUMENTS

JP 2000310377 A * 11/2000 ............ F16L 47/041
JP 2002-005361 A 1/2002

(Continued)

*Primary Examiner* — Zachary T Dragicevich
*Assistant Examiner* — James A Linford
(74) *Attorney, Agent, or Firm* — Maschoff Brennan

(57) ABSTRACT

A cap loosening prevention device prevents a cap from loosening when the cap is fitted to a body. The device includes a body ring formed in a circular shape along the circumference of the body and having a cut portion. A protruding part is formed on the outward surface of the body ring. The protruding part has an incline with respect to the outward direction of the body ring, and the uppermost end of the protruding part is cut perpendicularly with respect to the outward direction of the body ring. The cap is prevented from completely loosening in the direction opposite to the rotational direction of the cap when the cap is fitted to the body, such that the cap can be firmly coupled to the body without separating from the body. The rotation of the cap is minimized to enable a rapid operation when a pipe is replaced.

2 Claims, 6 Drawing Sheets

(56) References Cited

U.S. PATENT DOCUMENTS

| | | | | |
|---|---|---|---|---|
| 2014/0265312 A1* | 9/2014 | McAlister | ............ | F16L 19/005 285/305 |
| 2015/0362108 A1* | 12/2015 | Lefebvre | ............... | F16L 19/005 285/89 |
| 2017/0284574 A1 | 10/2017 | Crompton et al. | | |
| 2018/0080587 A1* | 3/2018 | Gauss | ................... | F16B 1/0071 |
| 2019/0270561 A1* | 9/2019 | Ophardt | ............... | B65D 55/022 |
| 2020/0386352 A1 | 12/2020 | Choi | | |

FOREIGN PATENT DOCUMENTS

| | | |
|---|---|---|
| JP | 2003-083492 A | 3/2003 |
| KR | 20-2008-0004462 U | 10/2008 |
| KR | 1020130132010 A | 12/2013 |
| KR | 10-1733058 B1 | 5/2017 |
| KR | 2020170006784 U | 7/2019 |

\* cited by examiner

[FIG.1]
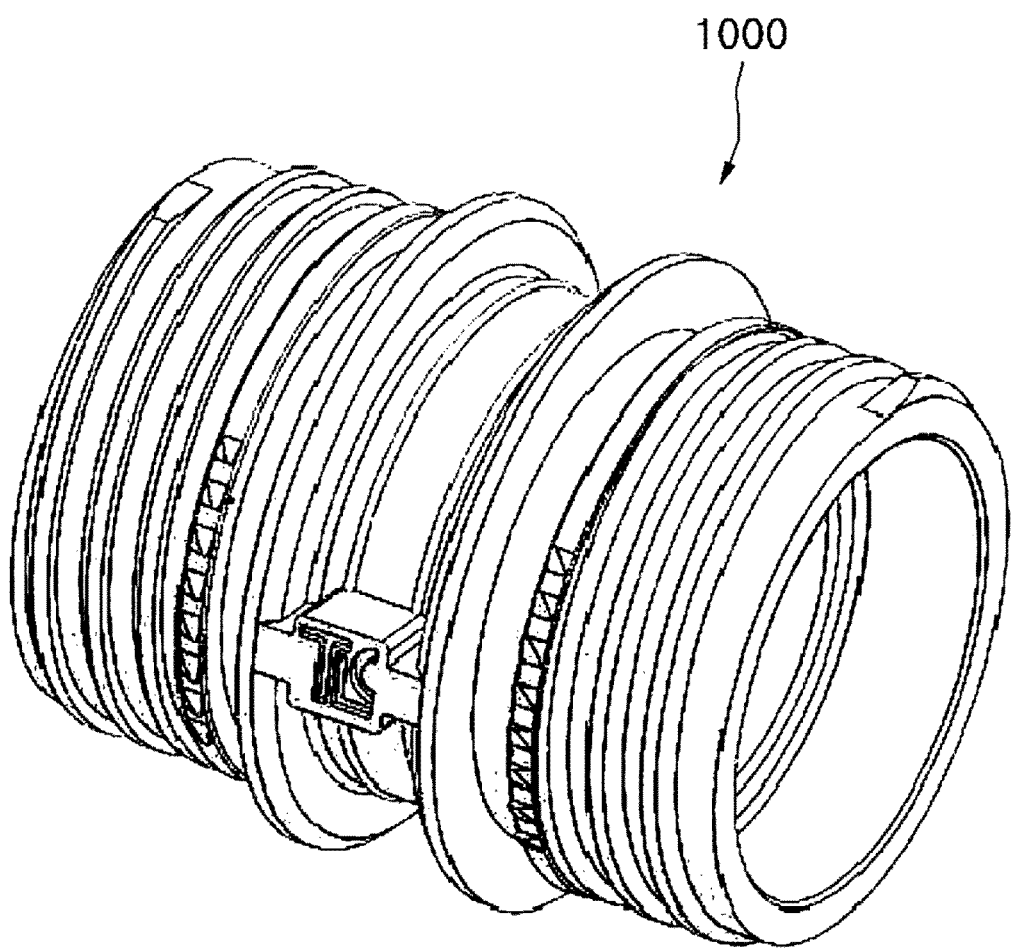

[FIG.2]
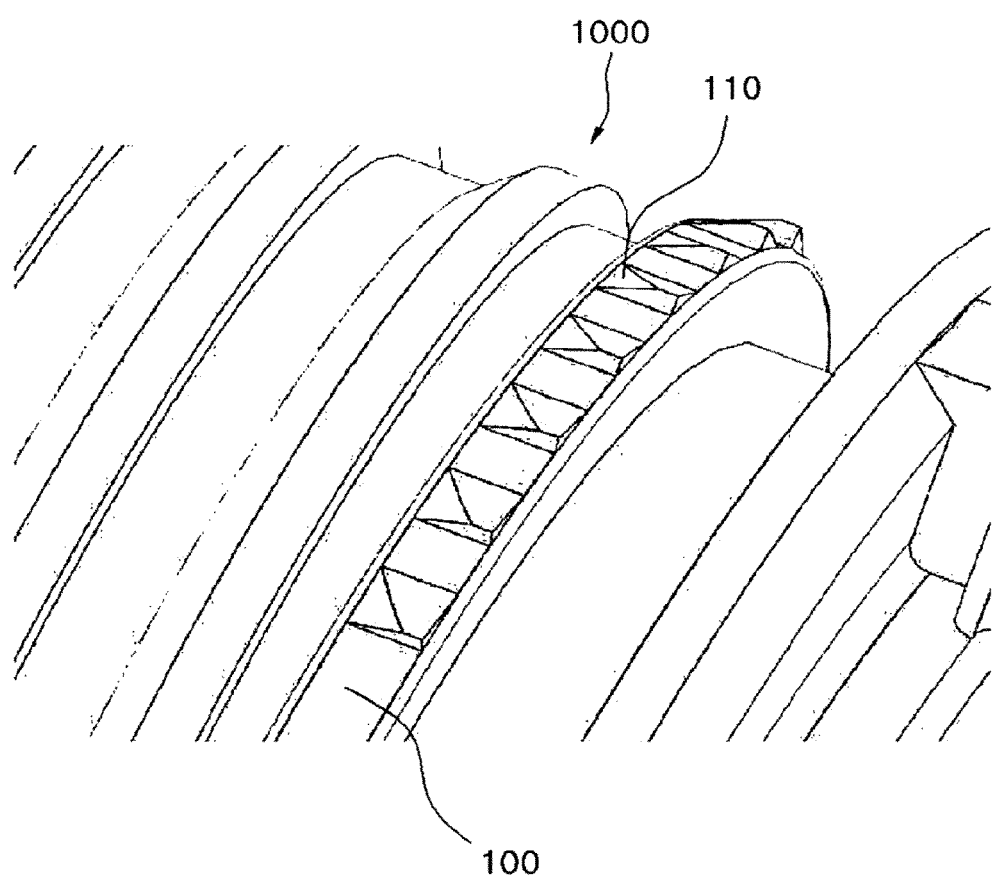

[FIG.3]
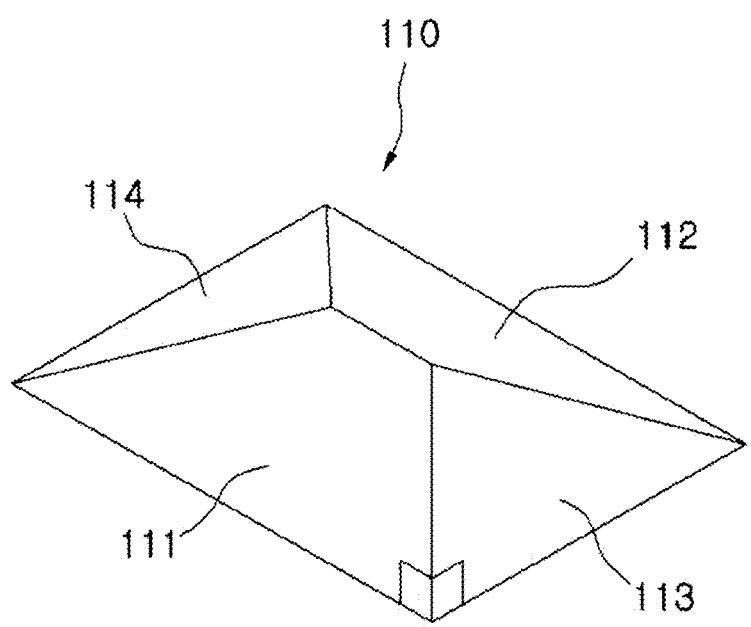
[FIG.4]
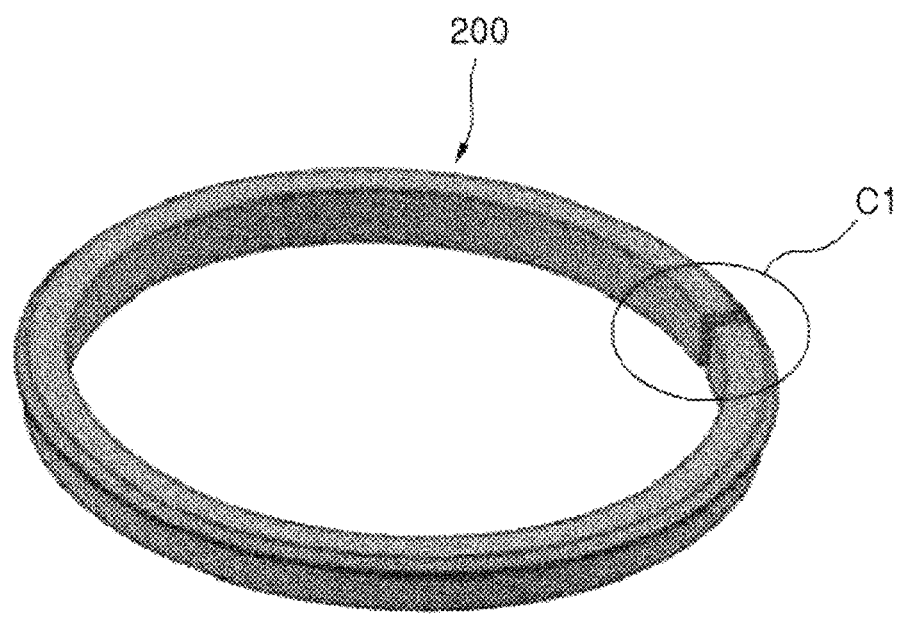

[FIG.5]
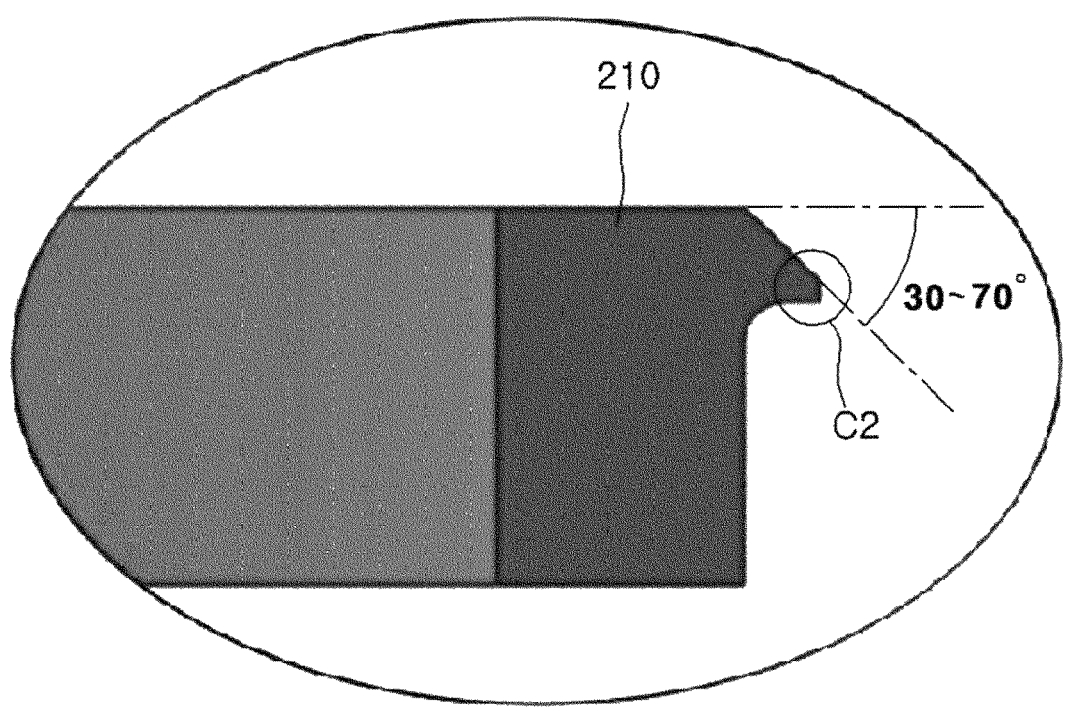

[FIG.6]
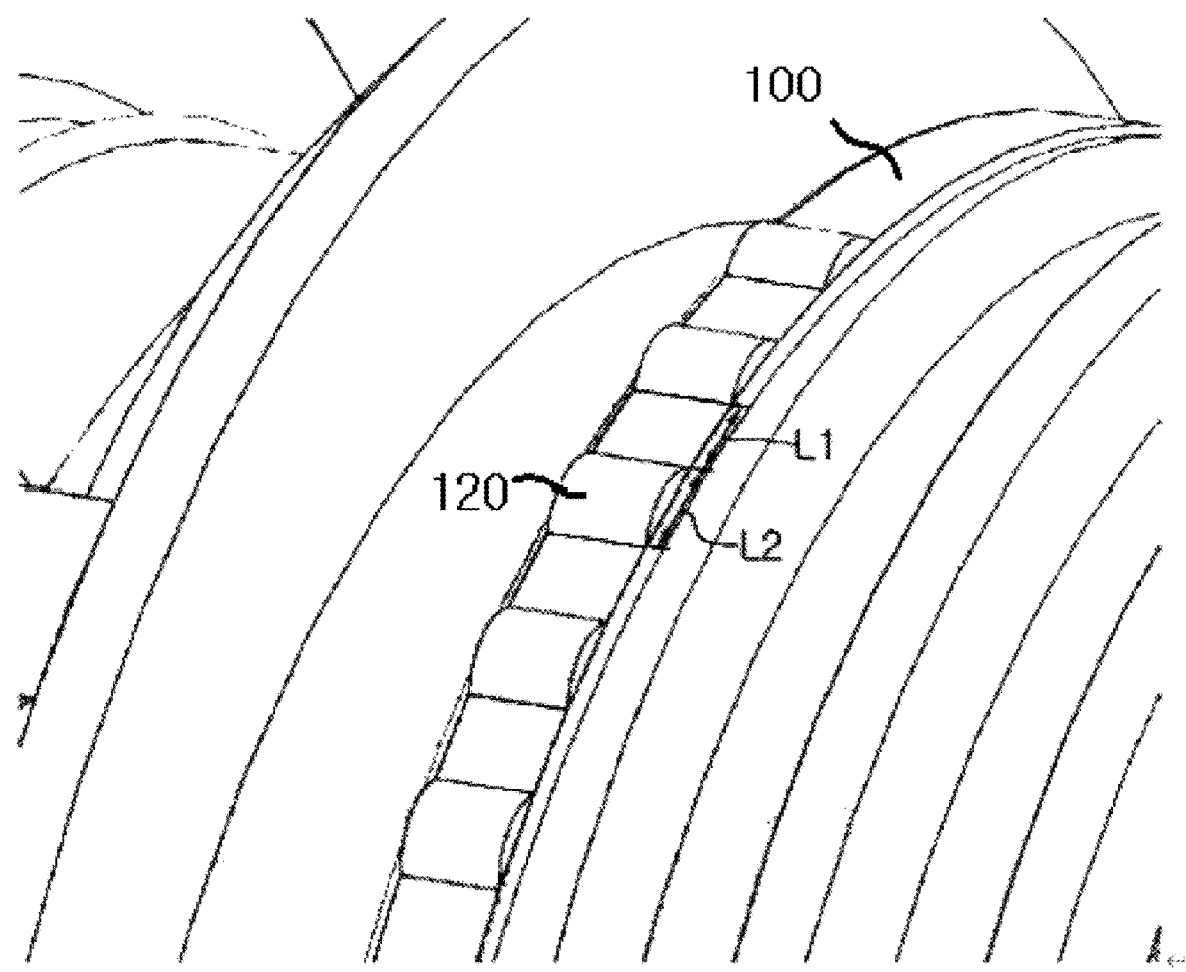

[FIG.7]
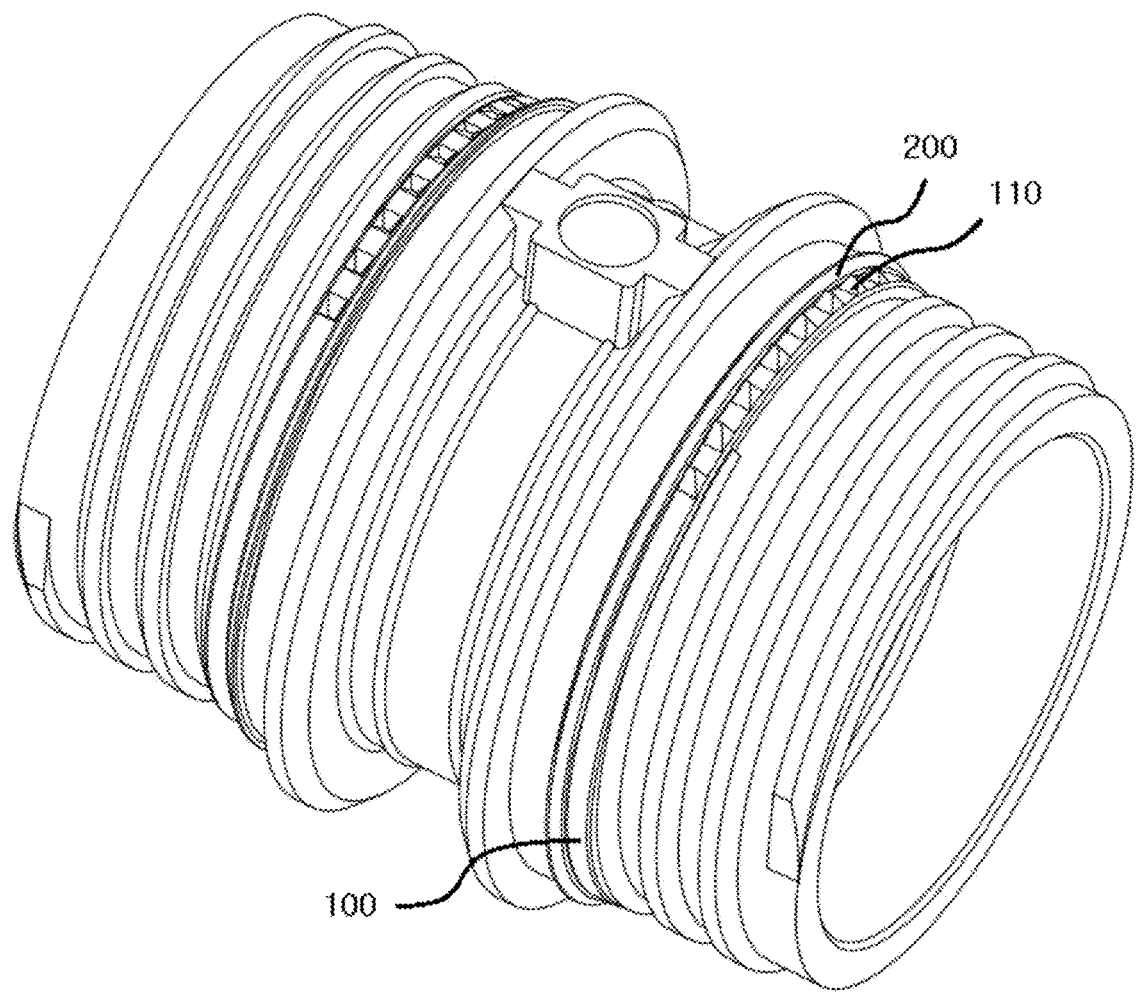

CAP LOOSENING PREVENTION DEVICE

TECHNICAL FIELD

The present invention relates to a cap loosening prevention device, and more particularly, to a cap loosening prevention device for preventing a cap from completely loosening in a direction opposite to a rotation direction of the cap in a state in which the cap is fitted to a body.

BACKGROUND ART

The descriptions disclosed in the Background Art herein are intended to improve the understanding of the background of the present invention, and may include matters other than the prior art that are already known to a person having ordinary skill in the art.

In general, a pipe is mainly used to transport a fluid such as water in a water-supply pipe or sewage pipe or oil in a hydraulic line, and transport various raw materials such as gas and powder.

Accordingly, a plumbing work generally refers to a work for forming a pipeline by cutting a pipe manufactured to have a predetermined length into a plurality of pipes and connect the pipes subject to installation environments. Due to the limited lengths of the pipes and the need to change a position of the pipeline during the plumbing work pipe connectors are used. The related art discloses that a cover 120 is rotated normal-wise and reverse-wise with respect to a housing 110 of a pipe connector such that the pipe may be attached or detached when a pipe is installed or replaced.

However, according to the related art, the cover 120 may be separated when the cover 120 coupled to the housing 110 of the connector is rotated, and accordingly a fluid may be leaked to the out surface due to miss-assembly when the pipe is connected.

DETAILED DESCRIPTION OF THE INVENTION

Technical Problem

In order to solve the above-mentioned problems in the related art, An object of the present invention is to provide a cap loosening prevention device for preventing a cap from completely loosening in a direction opposite to a rotation direction of the cap in a state in which the cap is fitted to a body so as to prevent the cap from being separated from the body, thereby facilitating a rapid work when the plumbing pipes are fastened.

Technical Solution

A cap loosening prevention device according to one embodiment of the present invention for preventing a cap from loosening when the cap is fitted to a body includes a body ring formed in a circular shape along a circumference of the body and having a cut portion, wherein a protruding part is formed on an outer surface of the body ring, the protruding part has an incline with respect to an outward direction of the body ring, and an uppermost end of the protruding part is cut in a direction perpendicular to the outward direction of the body ring.

An inner diameter of the body ring may be larger than an outer diameter of the body by 0.1 cm to 0.5 cm.

In addition, the incline is formed at an angle of 30° to 70° with respect to the outward direction of the body ring.

In addition, saw-tooth protrusions formed on the circumference of the body may be further included. Each of the saw-tooth protrusions may be formed to have a first surface formed perpendicular to an outer surface of the body, a second surface connecting an uppermost end of the first surface to the surface of the body, a third surface connecting the first surface to the second surface in the outward direction of the body, and a fourth surface connecting the first surface and the second surface to have a specific incline with respect to the outward direction. When the cap is reversely rotated to a rotation direction in a state in which the cap is fitted to the body and rotated from a portion where the second surface is positioned to a portion where the first surface is positioned, the first surface may prevent the cap from being reversely rotated so as to prevent the cap from loosening.

In addition, saw-tooth protrusions may be formed at predetermined intervals to have an angle within a specific range with respect to the circumference of the body.

In addition, round protrusions formed at predetermined intervals in a circumferential direction on the circumference of the body may be included.

Advantageous Effects of the Invention

According to the present invention, since the cap is prevented from completely loosening in the direction opposite to the rotation direction of the cap in a state in which the cap is fitted to the body, the cap can be firmly coupled to the body to prevent the cap from being separated from the body, and the rotation of the cap can be minimized when the pipe is replaced, so that a rapid work can be facilitated.

DESCRIPTION OF THE DRAWINGS

FIG. 1 is a perspective view of a cap loosening prevention device according to one embodiment of the present invention.

FIG. 2 is an enlarged perspective view of the cap loosening device according to one embodiment of the present invention.

FIG. 3 is a perspective view of a saw-tooth according to one embodiment of the present invention.

FIG. 4 is a perspective view of a body ring according to one embodiment of the present invention.

FIG. 5 is a sectional view of a portion of the body ring according to one embodiment of the present invention.

FIG. 6 is a perspective view of a round protrusion according to one embodiment of the present invention.

FIG. 7 is a perspective view of a cap loosening device including a body ring and saw-toothed protrusions according to one embodiment of the present invention.

BEST MODE

Advantages and features of the present invention, and methods of achieving the advantages and features will be apparent with reference to the embodiments described below with reference to the accompanying drawings. However, the present invention is not limited to the embodiments described as below and may be implemented in various different forms. The embodiments are provided to complete the disclosure of the present invention and clearly teach the scope of the invention to those skilled in the art, therefore, the present invention will be defined only by the scope of claims.

FIG. 1 is a perspective view of a cap loosening prevention device according to one embodiment of the present invention. FIG. 2 is an enlarged perspective view of the cap loosening device according to one embodiment of the present invention. FIG. 3 is a perspective view of a saw-tooth according to one embodiment of the present invention.

Referring to FIGS. 1 and 2, a cap loosening prevention device 1000 includes saw-tooth protrusions 110 formed on a circumference of the body 100 to prevent the cap from loosening when the cap is fitted to the body 100. The saw-tooth protrusion 110 forms a regular tetrahedron to have four surfaces on an outer surface of the body 100. Specifically, the first surface 111 is formed perpendicular to the outer surface of the body 100, and a second surface 112 connects an uppermost end of the first surface 111 to the surface of the body 100. In addition, a third surface 113 connects the first surface 111 to a second surface 112 in an outward direction of the body 100, and a fourth surface 114 connects the first surface 111 and a second surface 112 to have a specific incline with respect to the outward direction. Each of the first surface 111 to fourth surface 114 may have a triangular or quadrangular shape. The first surface 111 and the third surface 113 are perpendicular to each other.

Since the second surface 112 connects the uppermost end of the first surface 111 to the surface of the body 100 to form an oblique surface, the cap is prevented from being rotated excessively. The second surface 112 serves as a locking step.

In addition, when the cap is reversely rotated to a rotation direction in a state in which the cap is fitted to the body 100 and rotated from a portion where the second surface 112 is positioned to a portion where the first surface 111 is positioned, the first surface 111 prevents the cap from being reversely rotated so as to prevent the cap from loosening. In other words, when the cap is rotated from the portion where the second surface 112 is positioned to the portion where the first surface 111 is positioned, the portion where the first surface 111 is positioned forms a right angle to the surface of the body 100, so the cap cannot be rotated in a direction opposite to the rotation direction, so that the cap is prevented from loosening. The first surface 111 serves as a locking step.

In addition, saw-tooth protrusions 110 may be formed at predetermined intervals to have an angle within a specific range with respect to the circumference of the body 100, because it is not necessary to form the saw-tooth protrusions 110 on the entire surface of the body 100 to prevent the cap from being rotated in the direction opposite to the rotation direction of the cap. In addition, a space for one saw-tooth protrusion 110 may be formed between two adjacent saw-tooth protrusions 110.

FIG. 4 is a perspective view of a body ring according to one embodiment of the present invention. FIG. 5 is a sectional view of a portion of the body ring according to one embodiment of the present invention.

Referring to FIGS. 4 and 5, the body ring 200 is formed in a circular shape along the circumference of the body and has a cut portion (see C1). The reason to cut a portion of the body ring 200 is not only for opening the body 100 when the body 100 is inserted into the body ring 200, but also for enabling smooth assembly by the separation between cut surfaces through a tensioning action (that is, condensation of the body ring 200) when the cap is rotated normal-wise and assembled. In addition, it is because a bottom surface of a protruding part 210 of the body ring 200 abuts against a protrusion surface of the cap by the separation generated upon the reverse-wise rotation of the cap when the body ring 200 is opened in the fastened cap to prevent the cap from being separated, while preventing a damage to the body ring 200. The body ring 200 is formed of a general plastic material.

In addition, an inner diameter of the body ring 200 is 0.1 cm to 0.5 cm larger than an outer diameter of the body 100. Accordingly, since a space may be formed between the body ring 200 and the body 100, the cap is smoothly fastened to the body 100. When the inner diameter of the body ring 200 is larger than the outer diameter of the body 100 by less than 0.1 cm, the protruding part (described later) of the body ring 200 has a high risk to be damaged. When the inner diameter of the body ring 200 is larger than the outer diameter of the body 100 by more than 0.5 cm, tension becomes weak. Accordingly, a thickness becomes thinner and the opened strength is reduced, so a strength for preventing the cap from loosening is weakened.

In addition, the protruding part 210 is formed on the outward surface of the body ring 200. Compared to a structure in which the protruding part 210 is absent from the body ring 200, the structure in which the protruding part 210 is formed on the body ring 200 enables a worker to easily grip the body ring 200. The protruding part 210 has an incline with respect to the outward direction of the body ring 200. Preferably, the incline is formed at an angle of 30° to 70° with respect to the outward direction of the body ring 200. When the incline is less than 30° with respect to the outward direction of the body ring 200, it is difficult to assemble the cap to the body 100. When the incline exceeds 70° with respect to the outward direction of the body ring 200, the cap is prevented from being easily locked to the body 100.

When the body ring 200 is assembled, the cut portion of the body ring 200 is opened and fit to a lower side of the body 100. The protruding part 210 of the body ring 200 is required to be assembled in a direction of a protruding portion of the body 100 to function properly.

In addition, an uppermost end of the protruding part 210 is cut perpendicular to the outward direction of the body ring 200 (see C2). The reason of the cut in the above manner is to minimize a damage to a protrusion in the outward direction when the cap is assembled.

FIG. 6 is a perspective view of a round protrusion according to one embodiment of the present invention. Referring to FIGS. 1 and 6, the cap loosening prevention device 1000 includes round protrusions 120 formed at predetermined intervals in a circumferential direction on the circumference of the body 100 to prevent the cap from loosening when the cap is fitted to the body 100.

The round protrusion 120 denotes a protrusion forming a circular shape in the circumferential direction of the body 100, in which the round protrusion 120 is viewed as a quadrangular shape when the outer surface of the body 100 is viewed from the front thereof.

The predetermined interval L1 may be designed to be the same as a circumferential length L2 of the round protrusion 120 when the round protrusions 120 are disposed along the circumference of the body 100, but is not limited thereto. The shorter the predetermined interval L1 and the circumferential length L2, the more the round protrusions 120 may be disposed on the body 100. On the contrary, the longer the predetermined interval L2 and the circumferential length L2, the less the round protrusions 120 may be disposed on the body 100.

When the cap is reversely rotated to a rotation direction in a state in which the cap is fitted to the body 100 and rotated from a portion having the predetermined interval L1 to a portion where the round protrusion 120 is positioned, the round protrusion 120 is engaged with a lower protrusion inside the cap to prevent a reverse rotation of the cap, so that the cap is prevented from loosening. The round protrusion 120 serves as a locking step.

When the cap is rotated using an excessive force for the convenience of a user, the cap may be completely released since a rotational resistance value of the round protrusion is lower than that of the saw-tooth protrusion.

The above-described embodiments of the present invention have been described for further understanding with reference to the embodiment shown in the drawings, but are only for exemplary illustrations and it will be understood by those skilled in the art that various modifications and other equivalent embodiments may be applicable based on the above-described embodiments. Therefore, the actual scope of the present invention will be defined by the appended claims and their equivalents.

The invention claimed is:

1. A cap loosening prevention device for preventing a cap from loosening when the cap is fitted to a body, the cap loosening prevention device comprising:

a body ring formed in a circular shape along a circumference of the body including a protruding part that is formed on an outward surface of the body ring and saw-tooth protrusions formed on an outer surface of the body, wherein each of the saw-tooth protrusions has a first surface formed perpendicular to an outer surface of the body, a second surface connecting an uppermost end of the first surface to the surface of the body, a third surface connecting the first surface to the second surface in an outward direction of the body, and a fourth surface connecting the first surface and the second surface to have a specific incline with respect to the outward direction, and the first surface prevents the cap from being reversely rotated when the cap is reversely rotated to a rotation direction in a state in which the cap is fitted to the body and rotated from a portion where the second surface is positioned to a portion where the first surface is positioned, so that the cap is prevented from loosening, wherein:

the first surface to the fourth surface has a triangular or quadrangular shape, and the first surface and the third surface are perpendicular to each other, and the second surface connects an uppermost end of the first surface to a surface of the body.

2. The cap loosening prevention device of claim 1, wherein the saw-tooth protrusions are formed at predetermined intervals to have an angle within a specific range with respect to the circumference on the outer surface of the body.

* * * * *